T. F. SEITZ.
FILTER.
APPLICATION FILED JAN. 12, 1909.
956,832.
Patented May 3, 1910.
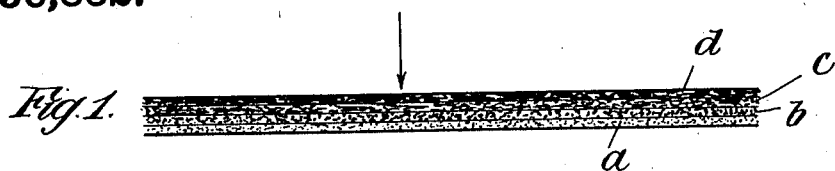
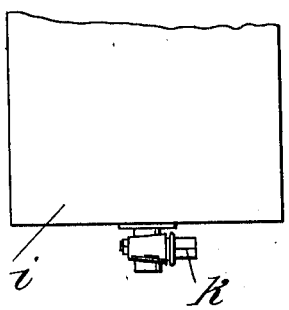
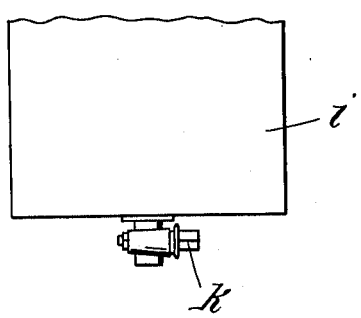
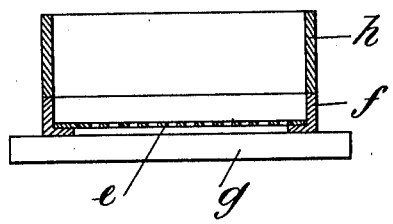
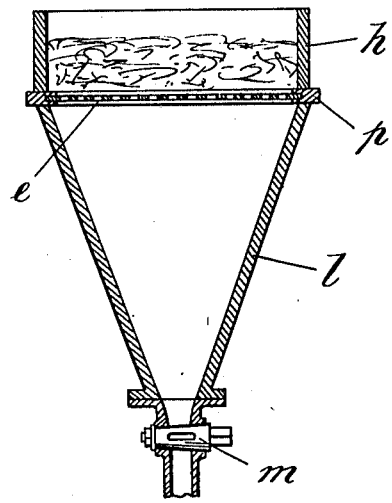
Witnesses:-
Henry Thieme
F. George Barry
Inventor:-
Theobald Friedrich Seitz
by his attorneys
Brown & Seward

UNITED STATES PATENT OFFICE.

THEOBALD FRIEDRICH SEITZ, OF KREUZNACH, GERMANY.

FILTER.

956,832.  Specification of Letters Patent.  Patented May 3, 1910.

Application filed January 12, 1909. Serial No. 471,929.

*To all whom it may concern:*

Be it known that I, THEOBALD FRIEDRICH SEITZ, manufacturer, a subject of the German Emperor, and resident of Kreuznach, Rhineland, Germany, with the post-office address Bahnstrasse, No. 26, have invented new and useful Improvements in Filters, of which the following is a specification.

My invention relates to filters and more particularly to a paper-like or cake-like slab of filtering material for use in filters, and to the method of producing it, with the object in view of providing a filtering unit, layer or stratum in one integral piece and at the same time composed of sublayers or strata of different degrees of permeability in the direction of flow of the liquid being filtered but of substantially uniform permeability in a single plane of the substratum or layer at right angles to the direction of flow, whereby the liquid to be filtered will be gradually freed from its impurities as it advances through the layer of filtering material and the filtering material may be cut or formed to fit filters of varying sizes and shapes and may be removed as a whole and replaced or exchanged.

With this end in view, my invention consists in a filter layer or unit (filter-paper, filter-cake or the like) capable of being inserted in filtering apparatuses and provided with pores which are of varying fineness in the direction of flow of the liquid to be filtered.

My invention further consists in the process for producing such a filtering unit.

The layers are preferably arranged in such a manner that a layer having a low degree of permeability has superposed thereon a layer of a higher degree of permeability, and this, in the event more than two layers are employed, having superposed thereon a layer of still higher degree of permeability and so on; in other words, the layers are superposed in such a manner that the fineness of the fibers or the like used in the production of the layers varies according to a definite ratio. A different serial order may, however, be adopted for the arrangement of the layers, when rendered necessary for the treatment of any given liquid.

In place of making the filtering layers of several superimposed layers of fibers of different permeability, each layer being of uniform density throughout, the several strata of the filtering material used may be made of the same material (fibers etc.) and the different degrees of permeability obtained by subjecting the fibers of the different layers to different pressures. These fibers composing the substrata may be deposited one above another by a suspension process so that they will be of substantially uniform porosity throughout a single substratum, and this may be accomplished by allowing the water in which the fibers are held in suspension to slowly drain off under gravity, or the water may be drawn from the material in a forcible manner by producing more or less of a vacuum beneath the material. This process is distinguished from the process where pressure is employed to force the water from the filtering material and which results in reducing the porosity of the filtering material in immediate proximity to the walls employed for applying the pressure while leaving the porosity greater intermediate of such walls, thereby producing a non-homogeneous body.

The accompanying drawings represent two practical means of producing a filtering unit embodying my invention.

Figure 1 is a diagrammatical section through a layer of filtering material, indicating several substrata of different degrees of fineness. Fig. 2 illustrates one way of depositing the several substrata, and Fig. 3 represents a second way of depositing several substrata.

Referring to Fig. 1, the layer $a$ consists of the finest fibers, the next layer $b$ of coarser fibers, the layer $c$ of still coarser ones, and finally, the layer $d$ of the coarsest fibers of all.

When the liquid in course of filtration flows through the filtering material in the direction indicated by the arrow, the coarsest of the foreign matter is retained by the outermost layer $d$, while the finer foreign matter is retained by the other layers according to their several degrees of permeability.

The mass employed for making the filter may consist of any substance suitable for the purpose, such, for example, as cellulose, asbestos fibers, cotton fibers, etc. Canvas, metal cloth, etc. may be employed as a base on which the filtering material is built and reinforcing membranes may also be embedded in or between all or any two of the layers of the filter, as indicated by the fine horizontal lines, Fig. 1, in order to prevent bursting under any pressure or breakage in transit.

In Fig. 2, a sieve pan *f* provided with a sieve *e* is laid on a support *g*, with suitable means for preventing leakage. Above the pan is mounted a box-shaped frame *h*, which is also packed at its junction with the pan to prevent leakage, and above the whole is a storage vessel *i* with an outlet closed by a cock *k*. The storage vessel *i* contains the filtering material suspended in liquid, and consisting, for example, of cellulose, cotton fibers, asbestos fibers or the like, in suspension. By means of the cock *k*, the mass is allowed to flow from this vessel *i* into the box frame *h*, and to fill this to a predetermined height. Then, by suddenly removing the support *g* or lifting the pan *f* together with the frame *h*, the water in the latter is drained off, the mass thereby settling down as a layer distributed quite uniformly over the sieve *e*. A second layer may be deposited on this first layer by filling the box frame *h* either from the same storage vessel, or from another similar vessel containing a filtering material of different permeability, for instance, coarser fibers, thus forming a superimposed layer of different permeability, and additional superimposed layers may be formed one after another. Even if the several layers be deposited from the same storage vessel with fibers of the same fineness in suspension, the resulting filtering layer will consist of a number of substrata of different permeability merging one into another because the thin layer first formed is produced under slighter resistance than the later ones. Again, in the modified form shown in Fig. 3, the support *g* is replaced by a hopper *l* closed at the bottom by a cock *m*. The cock *m* being closed, the hopper *l* is filled with liquid up to the level of the sieve *e*, so that a very shallow layer of water covers the latter. The box frame *h* is now charged with the liquid containing the fibrous mass in suspension, and this liquid is drawn off through the sieve *e* by opening the cock *m*. In this case, also, the frame *h* may be re-charged with fibers of the same fineness or coarser in suspension, so as to form the different layers. Here, also, for the same reasons as hereinabove stated, layers formed from a single supply vessel will form a stratified deposit in which the strata have different degrees of permeability.

In the modification shown in Fig. 3, the sieve pan is replaced by the sieve frame *p*. In this instance the water flowing from within the hopper, tends to leave a vacuum behind it and this will tend to draw the water rapidly from the charge on the sieve.

When the formation of the layer of filtering material composed of several substrata is completed, the box frame *h* is removed and the sieve pan *f* or sieve frame *p* is placed in the filtering apparatus, not shown, along with the filtering layer deposited upon it. A fresh sieve frame may be inserted into the device and the process may be repeated.

The working height of the water which flows from the hopper can be regulated by attaching a flexible pipe to the nozzle of the cock *m* and leading its free end to the height to give the desired working pressure. This flexible pipe is not shown in the drawings but may be of any well known or approved form suitable for the purpose.

If it be desired to remove the filtering layer from the sieve or sieve frame, a piece of canvas or metal cloth or the like may be first laid on the sieve frame or bottom of the sieve box and the layer of filtering material may be deposited upon it. The filter layer or unit formed as above may be manufactured and sold independently of any particular filter and may be cut or fitted as may be desired.

What I claim is:

1. A filtering unit capable of being inserted in a filter apparatus, consisting of intimately connected strata, each stratum being homogeneous in respect to its porosity and the different strata having pores of different degrees of fineness, the several strata being arranged transversely to the direction of flow of liquid therethrough.

2. The process of making a unit of filtering material consisting in depositing by suspension in liquid and removal of liquid, a stratum of fibers having a greater degree of permeability on a previously deposited stratum of fibers having a lesser degree of permeability, thereby forming intimately connected but well defined strata of different degrees of permeability.

In testimony, that I claim the foregoing as my invention, I have signed my name in presence of two witnesses, this 31st day of December 1908.

THEOBALD FRIEDRICH SEITZ.

Witnesses:
WILHELM GINDICE,
MARTIN BAUER.